(12) United States Patent
Kelly et al.

(10) Patent No.: US 8,255,348 B2
(45) Date of Patent: Aug. 28, 2012

(54) APPARATUS AND METHOD FOR ORDER GENERATION AND MANAGEMENT TO FACILITATE SOLUTIONS OF DECISION-MAKING PROBLEMS

(75) Inventors: Jeffrey D. Kelly, Scarborough (CA); Danielle Zyngier, Bolton (CA)

(73) Assignee: Honeywell International Inc., Morristown, NJ (US)

( * ) Notice: Subject to any disclaimer, the term of this patent is extended or adjusted under 35 U.S.C. 154(b) by 1209 days.

(21) Appl. No.: 12/044,639

(22) Filed: Mar. 7, 2008

(65) Prior Publication Data

US 2009/0228419 A1    Sep. 10, 2009

(51) Int. Cl.
*G06F 17/00* (2006.01)
*G06N 5/02* (2006.01)

(52) U.S. Cl. .............................. 706/46; 700/83; 715/207
(58) Field of Classification Search ............... 706/46
See application file for complete search history.

(56) References Cited

U.S. PATENT DOCUMENTS

| | | | |
|---|---|---|---|
| 7,233,931 B2 | 6/2007 | Lee et al. | |
| 2005/0144147 A1* | 6/2005 | Lee et al. .................. | 706/12 |
| 2006/0200333 A1 | 9/2006 | Dalal et al. | |
| 2007/0078692 A1* | 4/2007 | Vyas ........................... | 705/7 |
| 2007/0150496 A1* | 6/2007 | Feinsmith ................... | 707/100 |
| 2007/0255769 A1 | 11/2007 | Agrawal et al. | |

OTHER PUBLICATIONS

Jeffrey D. Kelly et al., "Apparatus and Method for Hierarchical Decomposition of Planning, Scheduling, and Other Decision-Making Problems", U.S. Appl. No. 12/037,574, filed Feb. 26, 2008, All pages.
Jeffrey D. Kelly et al., "Hierarchical decomposition heuristic for scheduling: Coordinated reasoning for decentralized and distributed decision-making problems", Computers & Chemical Engineering, 2007, 22 pages.
Jeffrey D. Kelly, "The Unit-Operation-Stock Superstructure (UOSS) and the Quantity-Logic-Quality Paradigm (QLQP) for Production Scheduling in the Process Industries", MISTA 2005 Conference, New York City, Jul. 18 to 21, 2005, 7 pages.
Jeffrey D. Kelly, "Modeling Production-Chain Information", Information Technology, www.cepmagazine.org, Feb. 2005, pp. 28-31.
"Production Scheduler" Engineering Guide, Honeywell, Feb. 2008, 53 pages.
Robert Fourer et al., "Optimization Services 1.0 User's Manual", Jan. 16, 2008, 77 pages.
Jeffrey D. Kelly et al., "A Projectional Model of Data for Complexity Management of Enterprise-Wide Optimization Models", Honeywell Process Solutions, 2007, 42 pages.

(Continued)

*Primary Examiner* — Kakali Chaki
*Assistant Examiner* — Kalpana Bharadwaj

(57) ABSTRACT

A system includes a plurality of hierarchical layers configured to solve a decision-making problem. Each hierarchical layer is configured to generate solution data representing a possible solution to a sub-problem associated with the decision-making problem. Each hierarchical layer is also configured to receive orders and to use the orders during generation of the solution data. The orders include orders based on the solution data from a higher hierarchical layer, orders based on feedback from a lower hierarchical layer, and/or orders that are exogenously provided. Each hierarchical layer could be configured to use the orders to simplify a search for the possible solution to the sub-problem being solved by that hierarchical layer, such as by excluding solutions inconsistent with the orders.

20 Claims, 4 Drawing Sheets

OTHER PUBLICATIONS

Matthew H. Bassett at al., "Decomposition Techniques for the Solution of Large-Scale Scheduling Problems", Process Systems Engineering, AIChE Journal, vol. 42, No. 12, Dec. 1996, pp. 3373-3387.

R. Cheng et al., "Price-driven coordination method for solving plantwide MPC problems", Journal of Process Control, 2006, 10 pages.

George B. Dantzig et al., "Decomposition Principle for Linear Programs", Nov. 24, 1959, pp. 101-111.

Muge Erdirik Dogan et al., "A Decomposition Method for the Simultaneous Planning and Scheduling of Single-Stage Continuous Multiproduct Plants", Ind. Eng. Chem. Res., 2006, pp. 299-315.

J. Fraser Forbes et al., "Model Accuracy for Economic Optimizing Controllers: The Bias Update Case", Ind. Eng. Chem. Res., 1994, pp. 1919-1929.

A. .M. Geoffrion, "Generalized Benders Decomposition", Journal of Optimization Theory and Applications, vol. 10, No. 4, 1972, pp. 237-260.

Kurt Jornsten et al., "Decomposition and iterative aggregation in hierarchical and decentralised planning structures", European Journal of Operational Research, 1995, pp. 120-141.

Rinaldo A. Jose et al., "Pricing Interprocess Streams Using Slack Auctions", AIChE Journal, 1999, pp. 1-53.

Ramkumar Karuppiah et al., "A Lagrangean based Branch-and-Cut algorithm for global optimization of nonconvex Mixed-Integer Nonlinear Programs with decomposable structures", Department of Chemical Engineering, Carnegie Mellon University, Jul. 2006, pp. 1-33.

Jeffrey D. Kelly, "Chronological Decomposition Heuristic for Scheduling: Divide and Conquer Method", AIChE Journal, vol. 48, No. 12, Dec. 2002, pp. 2995-2999.

Jeffrey D. Kelly, "Production Modeling for Multimodal Operations", Information Technology, www.cepmagazine.org, Feb. 2004, pp. 44-46.

Jeffrey D. Kelly, "Stock Decomposition Heuristic for Scheduling: A Priority Dispatch Rule Approach", Aug. 2004, 16 pages.

J. D. Kelly, "Logistics: the missing link in blend scheduling optimization", Hydrocarbon Processing, Jun. 2006, pp. 1-5.

Jeffrey D. Kelly et al., "Flowsheet decomposition heuristic for scheduling: a relax-and-fit method", Computers & Chemical Engineering, 2004, pp. 1-8.

Joseph Z. Lu, "Challenging control problems and emerging technologies in enterprise optimization", Control Engineering Practice, 2003, pp. 847-858.

Dan Wu et al., "Decomposition approaches for the efficient solution of short-term scheduling problems", Computers & Chemical Engineering, 2003, pp. 1261-1276.

N. Zhang et al., "Novel modelling and decomposition strategy for total site optimisation", Computers & Chemical Engineering, 2006, pp. 765-777.

Rinaldo A. Jose et al., "Auction-Driven Coordination for Plantwide Optimization", 1998, 6 pages.

Danielle Zyngier et al., "Multi-Product Inventory Logistics Modeling in the Process Industries", 2007, 35 pages.

Stephen J. Wilkinson, "Aggregate Formulations for Large-Scale Process Scheduling Problems", A Thesis submitted for the degree of Doctor of Philosophy of the University of London and for the Diploma of Membership of the Imperial College, Mar. 1996, 175 pages.

Danielle Zyngier, "Monitoring, Diagnosing and Enhancing the Performance of Linear Closed-Loop Real-Time Optimization Systems", A Thesis Submitted to the School of Graduate Studies in Partial Fulfillment of the Requirements for the Degree, Sep. 2006, 202 pages.

Rinaldo A. Jose, "On the Optimal Coordination of Profit Maximizing Divisions Using Auctions and Price Theory", Nov. 6, 1999, 246 pages.

Danielle Zyngier, "Monitoring, Diagnosing and Enhancing the Performance of Linear Closed-Loop Real-Time Optimization Systems", A Thesis Submitted to the School of Graduate Studies in Partial Fulfillment of the Requirements for the Degree, Sep. 2006, 219 pages.

* cited by examiner

APPARATUS AND METHOD FOR ORDER GENERATION AND MANAGEMENT TO FACILITATE SOLUTIONS OF DECISION-MAKING PROBLEMS

CROSS-REFERENCE TO RELATED APPLICATIONS

This application is related to U.S. patent application Ser. No. 12/037,574 filed on Feb. 26, 2008, which is hereby incorporated by reference.

TECHNICAL FIELD

This disclosure relates generally to planning, scheduling, and other decision-making systems. More specifically, this disclosure relates to an apparatus and method for order generation and management to facilitate solutions of decision-making problems.

BACKGROUND

Processing facilities and other entities are often required to perform planning and scheduling operations. Planning and scheduling typically involve sizing, sequencing, assignment, and timing decisions so that ideally specified due dates and deadlines are satisfied. For example, planning may involve determining a quantity of product to be produced by a specific deadline, while scheduling may involve determining how that product will be produced over time.

SUMMARY

This disclosure provides an apparatus and method for order generation and management to facilitate solutions of decision-making problems.

In a first embodiment, a system includes a plurality of hierarchical layers configured to solve a decision-making problem. Each hierarchical layer is configured to generate solution data representing a possible solution to a sub-problem associated with the decision-making problem. Each hierarchical layer is also configured to receive orders and to use the orders during generation of the solution data. The orders include orders based on the solution data from a higher hierarchical layer, orders based on feedback from a lower hierarchical layer, and/or orders that are exogenously provided.

In particular embodiments, each hierarchical layer is configured to use the orders to simplify a search for the possible solution to the sub-problem being solved by that hierarchical layer. The orders could, for example, be used to simplify the search for the possible solution by excluding solutions inconsistent with the orders.

In other particular embodiments, at least some of the hierarchical layers perform decision-making over different time horizons.

In yet other particular embodiments, at least one hierarchical layer is further configured to generate induced orders based on the orders received by that hierarchical layer.

In still other particular embodiments, the orders include orders establishing whether certain operations performed in a process system are primary or secondary operations. Also, one of the hierarchical layers includes a coordinator configured to generate a first offer, where the first offer identifies whether the certain operations are primary or secondary operations. Another of the hierarchical layers includes a cooperator configured to receive the first offer and to use the first offer to determine if the sub-problem associated with that hierarchical layer can be solved based on the first offer. The coordinator is further configured to generate a second offer when the cooperator indicates the sub-problem cannot be solved based on the first offer. The coordinator adjusts which operations are primary or secondary operations to produce the second offer.

In additional particular embodiments, the hierarchical layers include software applications executed on computing devices, where the computing devices are distributed at multiple levels in a process control system.

In a second embodiment, a method includes receiving orders at a first hierarchical layer, where the first hierarchical layer is configured to solve a first sub-problem associated with a decision-making problem using the orders. The method also includes generating first solution data representing a possible solution to the first sub-problem and outputting the first solution data. The orders include orders based on second solution data, orders based on feedback, and/or orders that are exogenously provided. The second solution data and/or the feedback is received from at least one second hierarchical layer that is configured to solve at least one second sub-problem associated with the decision-making problem.

In particular embodiments, at least one of the orders received by the first hierarchical layer is provided by a user. The user could, for example, submit the at least one order to guide a solution to the decision-making problem.

In a third embodiment, a computer program is embodied on a computer readable medium. The computer program includes computer readable program code for receiving orders at a first hierarchical layer, where the orders are associated with a decision-making problem. The computer program also includes computer readable program code for solving a first sub-problem associated with the decision-making problem using the orders to produce first solution data. The first solution data represents a possible solution to the first sub-problem. The computer program further includes computer readable program code for outputting the first solution data. The orders include orders based on second solution data, orders based on feedback, and/or orders that are exogenously provided. The second solution data and/or the feedback is received from at least one second hierarchical layer that is configured to solve at least one second sub-problem associated with the decision-making problem.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 5, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

This disclosure presents a technique for order management, which can be used to help find solutions to production scheduling or other decision-making problems. Production scheduling is often a very important tool for making decisions within an enterprise, a plant, or other entity. For example, production scheduling is often a necessary or desirable decision-making component for manufacturers and others in the process industry. As a particular example, production scheduling is often needed for plants that receive feed-stocks from suppliers, subject those feed-stocks to some level of processing (such as mixing, reacting, and separating) to produce product-stocks, and distribute the processed product-stocks to customers or other plants while managing intermediate-stocks or work-in-process.

Production scheduling can involve operations like planning (such as to determine a quantity of product to be produced by a specific deadline) and scheduling (such as to determine how that product will be produced over time). Production scheduling is often a complex problem to solve, typically involving a large number of variables. These variables can include various products to be produced, various pieces of industrial equipment to be used to produce the product, and various deadlines by which the products are to be produced. In addition to the large number of variables, many other challenges exist in production scheduling. These challenges can include the seamless integration of divisionalized or decentralized scheduling systems, the effective interaction of schedules by users, and the comprehensive institutionalization of complexity management regarding underlying mathematical or optimization models (which represent the system being scheduled). This disclosure uses the concept of "orders" in production scheduling and other decision-making problems, which can help to address these or other types of challenges.

Figure 1:
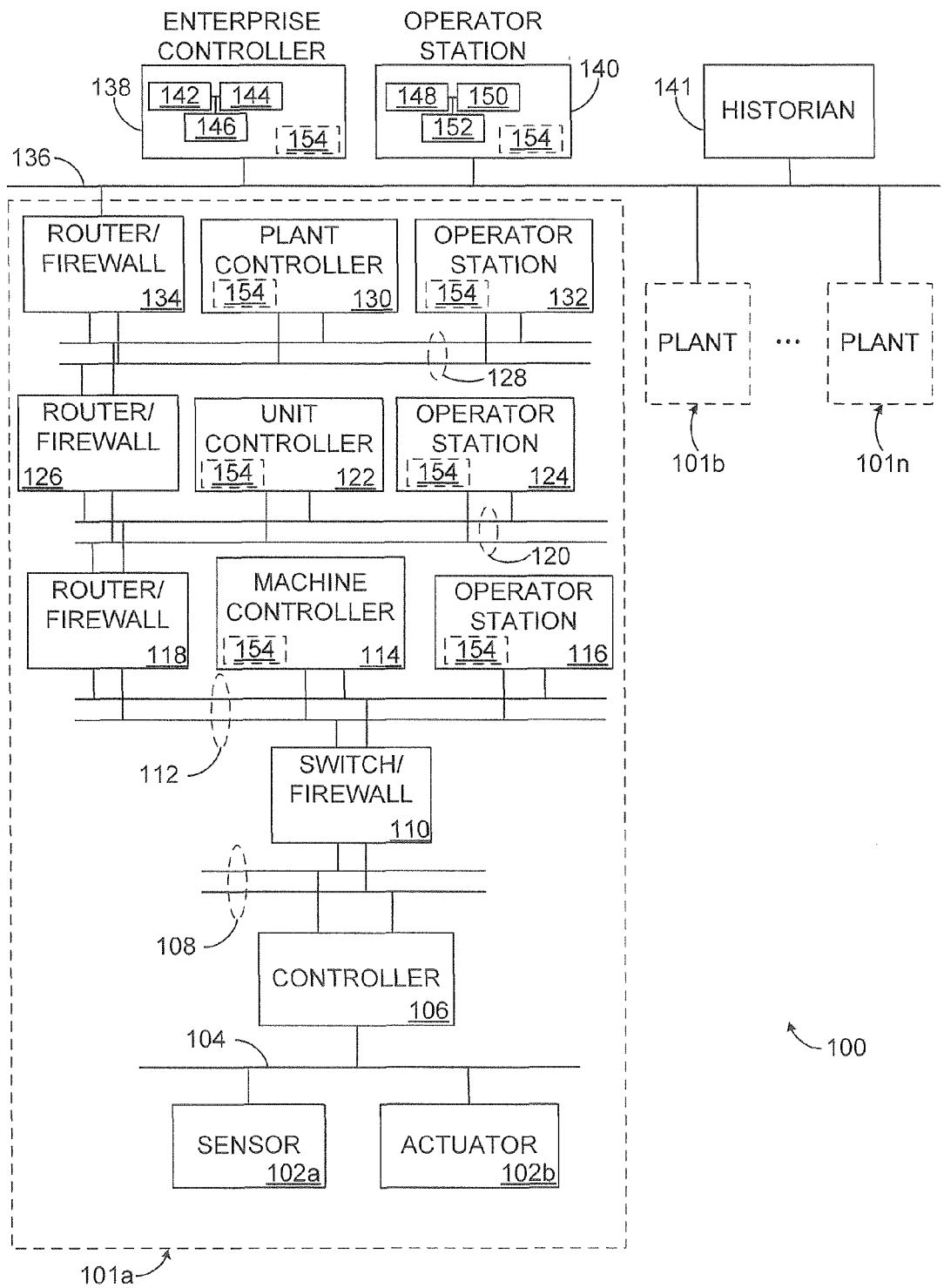
FIG. 1 illustrates an example process control system according to this disclosure.

FIG. 1 illustrates an example process control system 100 according to this disclosure. The embodiment of the process control system 100 shown in FIG. 1 is for illustration only. Other embodiments of the process control system 100 may be used without departing from the scope of this disclosure.

In this example embodiment, the process control system 100 includes various components that facilitate production or processing of at least one product or other material. For instance, the process control system 100 is used here to facilitate control over components in multiple plants 101a-101n. The plants 101a-101n represent one or more processing facilities (or portions of thereof), such as one or more manufacturing facilities for producing at least one product or other material. In general, each plant 101a-101n may implement one or more processes and can individually or collectively be referred to as a process system. A process system may generally represent any system or portion thereof configured to process one or more products or other materials in some manner.

In FIG. 1, the process control system 100 is implemented using the Purdue model of process control. In this model, "Level 0" may include one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system, such as heaters, motors, or valves. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting conditions in a process system.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent an Ethernet network, an electrical signal network (such as a HART or FOUNDATION FIELDBUS network), a pneumatic control signal network, or any other or additional type(s) of network(s).

In the Purdue model, "Level 1" may include one or more controllers 106, which are coupled to the network 104. Among other things, each controller 106 may use the measurements from one or more sensors 102a to control the operation of one or more actuators 102b. For example, a controller 106 could receive measurement data from one or more sensors 102a and use the measurement data to generate control signals for one or more actuators 102b. Each controller 106 includes any hardware, software, firmware, or combination thereof for interacting with one or more sensors 102a and controlling one or more actuators 102b. Each controller 106 could, for example, represent a multivariable controller, such as a Robust Multivariable Predictive Control Technology (RMPCT) controller or other type of controller. As a particular example, each controller 106 could represent a computing device running a MICROSOFT WINDOWS operating system.

Two networks 108 are coupled to the controllers 106. The networks 108 facilitate interaction with the controllers 106, such as by transporting data to and from the controllers 106. The networks 108 could represent any suitable networks or combination of networks. As particular examples, the networks 108 could represent a pair of Ethernet networks or a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as a pair of Ethernet networks or an FTE network.

In the Purdue model, "Level 2" may include one or more machine-level controllers 114 coupled to the networks 112. The machine-level controllers 114 perform various functions to support the operation and control of the controllers 106, sensors 102a, and actuators 102b, which could be associated with a particular piece of industrial equipment (such as boiler or other machine). For example, the machine-level controllers 114 could log information collected or generated by the controllers 106, such as measurement data from the sensors 102a or control signals for the actuators 102b. The machine-level controllers 114 could also execute applications that control the operation of the controllers 106, thereby controlling the operation of the actuators 102b. In addition, the machine-level controllers 114 could provide secure access to the controllers 106. Each of the machine-level controllers 114 includes any hardware, software, firmware, or combination thereof for providing access to, control of, or operations related to a machine or other individual piece of equipment. Each of the machine-level controllers 114 could, for example, represent a server computing device running a MICROSOFT WINDOWS operating system. Although not shown, different machine-level controllers 114 could be used to control different pieces of equipment in a process system (where each piece of equipment is associated with one or more controllers 106, sensors 102a, and actuators 102b).

One or more operator stations 116 are coupled to the networks 112. The operator stations 116 represent computing or communication devices providing user access to the machine-level controllers 114, which could then provide user access to the controllers 106 (and possibly the sensors 102a and actuators 102b). As particular examples, the operator stations 116 could allow users to review the operational history of the sensors 102a and actuators 102b using information collected by the controllers 106 and/or the machine-level controllers 114. The operator stations 116 could also allow the users to adjust the operation of the sensors 102a, actuators 102b, controllers 106, or machine-level controllers 114. In addition, the operator stations 116 could receive and display warnings, alerts, or other messages or displays generated by the controllers 106 or the machine-level controllers 114. Each of the operator stations 116 includes any hardware, software, firmware, or combination thereof for supporting user access and control of the system 100. Each of the operator stations 116 could, for example, represent a computing device running a MICROSOFT WINDOWS operating system.

At least one router/firewall 118 couples the networks 112 to two networks 120. The router/firewall 118 includes any suitable structure for providing communication between networks, such as a secure router or combination router/firewall. The networks 120 could represent any suitable networks, such as a pair of Ethernet networks or an FTE network.

In the Purdue model, "Level 3" may include one or more unit-level controllers 122 coupled to the networks 120. Each unit-level controller 122 is typically associated with a unit in a process system, which represents a collection of different machines operating together to implement at least part of a process. The unit-level controllers 122 perform various functions to support the operation and control of components in the lower levels. For example, the unit-level controllers 122 could log information collected or generated by the components in the lower levels, execute applications that control the components in the lower levels, and provide secure access to the components in the lower levels. Each of the unit-level controllers 122 includes any hardware, software, firmware, or combination thereof for providing access to, control of, or operations related to multiple machines or other pieces of equipment in a process unit. Each of the unit-level controllers 122 could, for example, represent a server computing device running a MICROSOFT WINDOWS operating system. Although not shown, different unit-level controllers 122 could be used to control different units in a process system (where each unit is associated with one or more machine-level controllers 114, controllers 106, sensors 102a, and actuators 102b).

Access to the unit-level controllers 122 may be provided by one or more operator stations 124. Each of the operator stations 124 includes any hardware, software, firmware, or combination thereof for supporting user access and control of the system 100. Each of the operator stations 124 could, for example, represent a computing device running a MICROSOFT WINDOWS operating system.

At least one router/firewall 126 couples the networks 120 to two networks 128. The router/firewall 126 includes any suitable structure for providing communication between networks, such as a secure router or combination router/firewall. The networks 128 could represent any suitable networks, such as a pair of Ethernet networks or an FTE network.

In the Purdue model, "Level 4" may include one or more plant-level controllers 130 coupled to the networks 128. Each plant-level controller 130 is typically associated with one of the plants 101a-101n, which may include one or more process units that implement the same, similar, or different processes. The plant-level controllers 130 perform various functions to support the operation and control of components in the lower levels. As a particular example, the plant-level controller 130 could execute one or more manufacturing execution system (MES) applications, scheduling applications, or other or additional plant or process control applications. Each of the plant-level controllers 130 includes any hardware, software, firmware, or combination thereof for providing access to, control of, or operations related to one or more process units in a process plant. Each of the plant-level controllers 130 could, for example, represent a server computing device running a MICROSOFT WINDOWS operating system.

Access to the plant-level controllers 130 may be provided by one or more operator stations 132. Each of the operator stations 132 includes any hardware, software, firmware, or combination thereof for supporting user access and control of the system 100. Each of the operator stations 132 could, for example, represent a computing device running a MICROSOFT WINDOWS operating system.

At least one router/firewall 134 couples the networks 128 to one or more networks 136. The router/firewall 126 includes any suitable structure for providing communication between networks, such as a secure router or combination router/firewall. The network 136 could represent any suitable network, such as an enterprise-wide Ethernet or other network or all or a portion of a larger network (such as the Internet).

In the Purdue model, "Level 5" may include one or more enterprise-level controllers 138 coupled to the network 136. Each enterprise-level controller 138 is typically able to perform planning operations for the plants 101a-101n and to control various aspects of the plants 101a-101n. The enterprise-level controllers 138 perform various functions to support the operation and control of components in the plants 101a-101n. As a particular example, the enterprise-level controller 138 could execute one or more order processing applications, enterprise resource planning (ERP) applications, advanced planning and scheduling (APS) applications, or any other or additional enterprise control applications. Each of the enterprise-level controllers 138 includes any hardware, software, firmware, or combination thereof for providing access to, control of, or operations related to the control of multiple plants. Each of the enterprise-level controllers 138 could, for example, represent a server computing device running a MICROSOFT WINDOWS operating system.

Access to the enterprise-level controllers 138 may be provided by one or more operator stations 140. Each of the operator stations 140 includes any hardware, software, firmware, or combination thereof for supporting user access and control of the system 100. Each of the operator stations 140 could, for example, represent a computing device running a MICROSOFT WINDOWS operating system.

A historian 141 is also coupled to the network 136 in this example. The historian 141 could represent a component that stores various information about the process control system 100. The historian 141 could, for example, store information used during production scheduling problem solving and other decision-making problem solving (as described in more detail below). The historian 141 represents any suitable component for storing and facilitating retrieval of information. Although shown as a single centralized component coupled to the network 136, the historian 141 could be located elsewhere in the system 100, or multiple historians could be distributed in different locations in the system 100.

In particular embodiments, the various controllers and operator stations in FIG. 1 may represent computing devices. For example, each of the controllers could include one or more processors 142 and one or more memories 144 for storing instructions and data used, generated, or collected by the processor(s) 142. Each of the servers could also include at least one network interface 146, such as one or more Ethernet interfaces. Also, each of the operator stations could include one or more processors 148 and one or more memories 150 for storing instructions and data used, generated, or collected by the processor(s) 148. Each of the operator stations could also include at least one network interface 152, such as one or more Ethernet interfaces.

In one aspect of operation, one or more complex decision-making problems may need to occur in various portions of the process control system 100 (or throughout the entire process control system 100). For example, production scheduling operations may need to be performed by the enterprise-level controllers 138, the plant-level controllers 130, or by any other controllers in the process control system 100.

To support finding solutions to production scheduling or other decision-making problems, one or more components in the process control system 100 include a hierarchical problem-solving application 154. The problem-solving application 154 could represent different functions in different components of the system 100. For example, as described in more detail below, production scheduling problems to be solved can be decomposed into a hierarchy of different elements, each of which can perform different functions to help solve an overall production scheduling problem. The same type of decomposition could similarly be used to solve a range of problems. In this way, the problem-solving application 154 supports the use of decomposition as a way of dealing with large or complex problems to be solved. Additional details regarding the problem-solving application 154 are provided below. The problem-solving application 154 includes any suitable hardware, software, firmware, or combination thereof for performing one or more functions related to identifying a solution for a production scheduling or other problem to be solved.

Although FIG. 1 illustrates one example of a process control system 100, various changes may be made to FIG. 1. For example, a control system could include any number of sensors, actuators, controllers, servers, operator stations, networks, and production scheduling or other applications. Also, the makeup and arrangement of the process control system 100 in FIG. 1 is for illustration only. Components could be added, omitted, combined, or placed in any other suitable configuration according to particular needs. In addition, FIG. 1 illustrates one operational environment in which production scheduling or other problem solving can be used. This functionality could be used in any other suitable device or system (whether or not related to process control).

FIGS. 2 through 5 illustrate an example technique for order generation and management to facilitate solutions of production scheduling or other decision-making problems according to this disclosure. The details regarding order generation and management provided below are for illustration only. Other order generation and management techniques could be used without departing from the scope of this disclosure. Also, while the order generation and management technique is described below in relation to solving a production scheduling problem, the same or similar technique could be used for solving other types of problems.

Decisions made during production scheduling can often relate to various issues, such as:
 sizing: how much or how many materials should be processed and stored;
 assignment: where and what materials should be processed and stored;
 sequencing: which succession of operations should be followed during processing; and
 timing: when should materials be processed.
These decisions are often dependent on information that is static and/or information that is dynamic. Static information may correspond to fixed characteristics or attributes of a process system and can include information such as configuration data (like sizings, timings, and specifications), connectivity data, and compatibility data. The static information can be collectively referred to as "model data." Dynamic information may include characteristics that can change during a scheduling horizon or during one or more cycles within a horizon. As examples of dynamic information, there can be several receipts of the same feed-stock with different arrival times during a scheduling horizon. There can also be several shipments of the same product-stock with different departure times during the scheduling horizon. Dynamic information can be collectively referred to as "cycle data" because it can be time-varying according to some singular or repeating cycle (although this is not required).

The order management technique provided in this disclosure is based on the concept of "orders." An order generally represents a time-series or transactional requirement that is to be executed sometime in the future. The use of orders in production scheduling or other decision-making problems can provide various benefits, such as the following. First, orders can enable the integration of diverse decision-making layers in an enterprise. Second, orders can aid in increasing the transparency of a model as well as the ownership of the schedule or other solution by end users. Third, orders can help to simplify and manage production scheduling or other problems. In particular, orders can help to organize and deal with the mathematical complexity in solving production scheduling or other problems by allowing continuous and/or binary variables to be fixed, forbidden, or freed in an optimization. This may be beneficial, for example, in mixed-integer linear programming (MILP) or successive linear programming (SLP).

Figure 2:
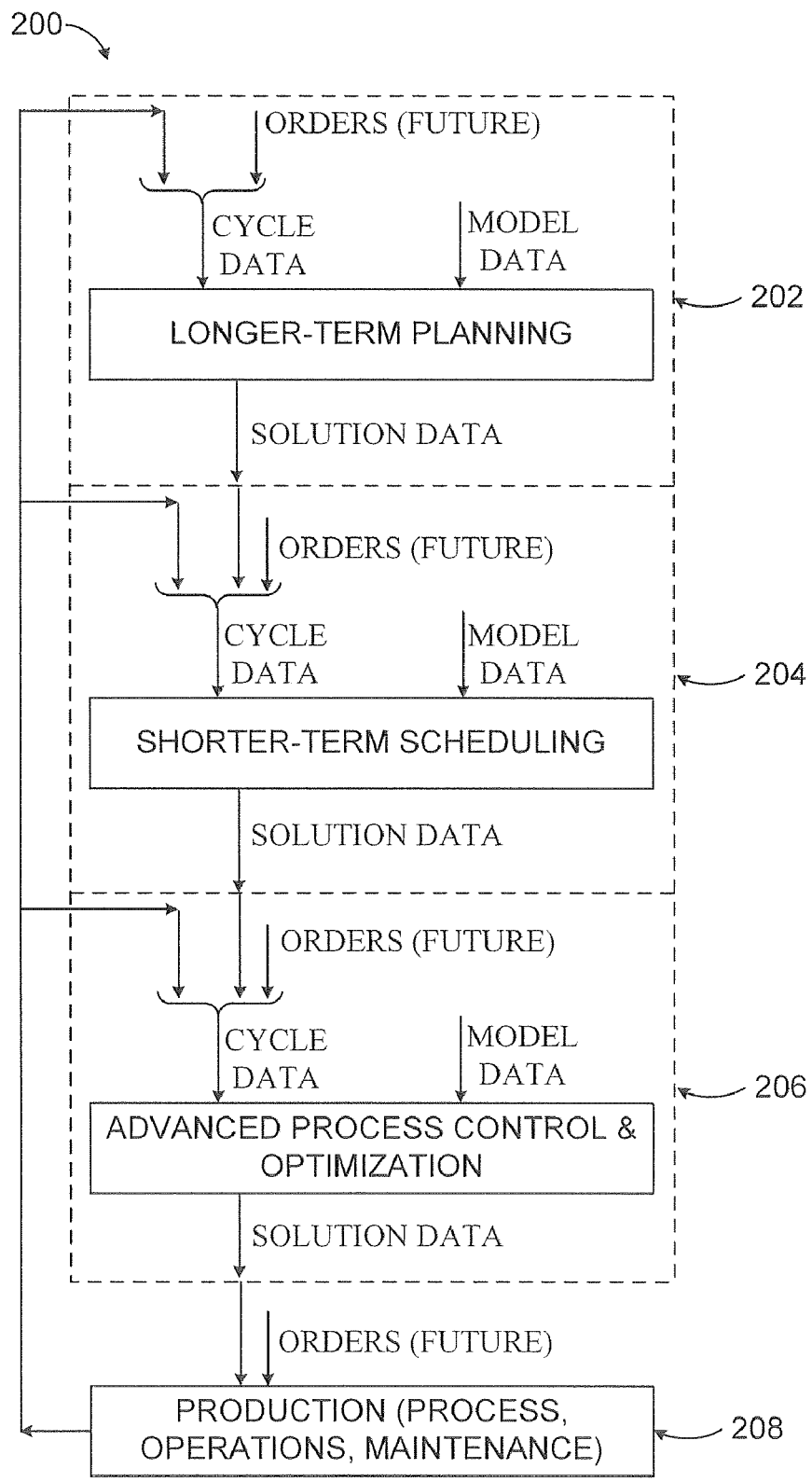
FIGS. 2 through 5 illustrate an example technique for order generation and management to facilitate solutions of production scheduling or other decision-making problems according to this disclosure.

A hierarchy of decision-making layers often exists in an enterprise or other organization and can be used to help solve the complex production scheduling or other problems. An example hierarchy is shown in FIG. 2, which illustrates a hierarchy 200 having four layers 202-208. These layers include a longer-term strategic and tactical planning layer 202, a shorter-term operational scheduling layer 204, an advanced process control and optimization layer 206, and a process control layer 208. This type of hierarchy 200 can be supported in the system 100 of FIG. 1, such as when different levels of the Purdue model correspond to different levels of the hierarchy 200. As a particular example, the longer-term strategic and tactical planning layer 202 could be implemented in "Level 5" of the Purdue model (such as in the controllers 138), and the remaining layers 204-208 could be implemented in the lower levels of the Purdue model (such as in the controllers 130, 122, 114). In these embodiments, the problem-solving application 154 in the various components in FIG. 1 could implement or support the layers 202-208 shown in FIG. 2.

It may be noted that while a single instance of each layer 202-208 is shown in FIG. 2, each layer could actually involve multiple components across multiple devices. For example, the longer-term strategic and tactical planning layer 202 could be implemented within the enterprise-level controller 138. Multiple shorter-term operational scheduling layers 204, advanced process control and optimization layers 206, and process control layers 208 could be implemented within the controllers in different plants 101a-101n. In this way, the hierarchy 200 can represent a distributed hierarchy used in various components within the process control system 100 or other system.

Each of these layers 202-208 can often affect production scheduling. Obviously, the upper layers 202-204 are directly involved in planning and scheduling the production of products over time, so these layers 202-204 clearly affect production scheduling. However, even the lower layers 206-208 can affect production scheduling, such as when decisions by the lower layers 206-208 affect inventory levels in a process system.

Each of the layers 202-208 in the hierarchy 200 typically involves a different scheduling horizon or period of time related to its operations. Longer-term strategic and tactical planning in layer 202 is often done over horizons of weeks, months, or years. Shorter-term operational scheduling in layer 204 is often done over horizons of hours, days, or weeks. Advanced process control and optimization in layer 206 is often done over horizons of seconds, minutes, or hours. Process control in layer 208 is often done over horizons of sub-seconds, seconds, or minutes.

During distributed production scheduling or other problem solving, all of the various layers 202-208 in the hierarchy 200 could be involved in establishing a feasible production schedule or other solution for an enterprise. In this type of hierarchy 200, the lower layers often contain more complex micro models or molecular models, while the upper layers contain macro models. As a result, during production scheduling or other problem solving, it is often necessary or desirable to consider shorter time horizons for the lower layers so that problems can be solved in reasonable computational times (such as in real-time or near real-time).

If executed in isolation, each layer 202-208 in the hierarchy 200 of FIG. 2 is likely to generate results that are not consistent with the decisions made by the other layers. Because of this, executing the layers 202-208 in isolation typically results in the generation of infeasible solutions or solutions that, if feasible, result in a loss of overall performance (such as due to over-optimization and under-optimization of resources).

To support more effective distributed production scheduling or other problem solving, each layer 202-208 in the hierarchy 200 of FIG. 2 is interconnected to its adjacent layers with various feedforward and feedback mechanisms. For example, as shown in FIG. 2, each of the layers 202-206 generally receives model data and cycle data. The model data represents static information corresponding to fixed characteristics or attributes of the process system. The cycle data takes the form of orders. The orders received by a layer 202-208 can include exogenously-defined orders (such as orders provided by users or external systems), which are denoted as "Orders (Future)" in FIG. 2. The orders received by a layer 204-208 could also include orders based on solution data from a prior layer. The solution data represents a solution to a decision-making sub-problem solved by the prior layer (in this example, a solution to a production scheduling sub-problem that is generated by the prior layer). The orders received by a layer 202-206 could further include orders based on feedback from a subsequent layer. In this way, the integration between the decision-making layers 202-208 in the hierarchy 200 can be achieved using the formalization of orders as shown in FIG. 2. This can enable more effective production scheduling or other problem solving in the hierarchy 200.

Orders can also be used within a single layer. For example, in the illustrated embodiment, the process control layer 208 is decomposed or divided into constituent components (namely process, operations, and maintenance components). This can be appropriate since a production setting often includes process, operations, and maintenance departments with skilled personnel and specialized tools. The interactions between these different departments can employ the notion of orders, such as safety orders, work orders, maintenance orders, and purchase orders (just to name a few).

Besides facilitating integration of the layers 202-208 in the hierarchy 200, the orders can be used to increase both the transparency and control of the production scheduling or other problem to users. At the same time, the orders also increase the users' sense of accountability of the schedule or other solution. The users are able to interact with or "steer" the decision-making solution to their needs. Since orders can be placed exogenously by a user as well as from other systems, a user's more detailed knowledge of a process system can be applied, which can significantly influence and manipulate the solutions.

Moreover, a significant amount of degeneracy in production scheduling or other problems can be removed by inserting appropriate orders. For example, degeneracy increases the search space or scope of a problem and therefore potentially slows down the time to find a scheduling or other solution. This can be especially true in branch-and-bound or implicit enumerative searches at the core of MILP. One simple example is a process with two identical and dedicated units in parallel where only a single unit is necessary throughout the scheduling horizon given the production demands. If an order is placed that forbids one of the units from being assigned during the scheduling horizon, the assignment decision throughout the scheduling horizon is trivialized since only one unit is free to be operated (which is the one that the user selected). In this sense, orders may be used as "symmetry breakers" to consume degrees of freedom in the scheduling or other problem.

In addition, scheduling and other types of problems can be combinatorial in nature and therefore often represent very challenging optimization problems. The size or complexity of a scheduling or other problem can be significantly reduced by removing some of the logic decision variables from the problem before it is solved. In other words, orders can be used to simplify a problem by excluding solutions that are inconsistent with the orders. As a simple example, suppose two pieces of equipment could be used to process material, but a user initiates an order that occupies one of the pieces for an entire scheduling horizon (which could be done so that maintenance can be performed). This simplifies the scheduling problem for any remaining orders since all orders must be scheduled on the one remaining piece of equipment during the scheduling horizon. Any possible solution to the scheduling problem that relies on both pieces of equipment would be excluded.

Figure 3:
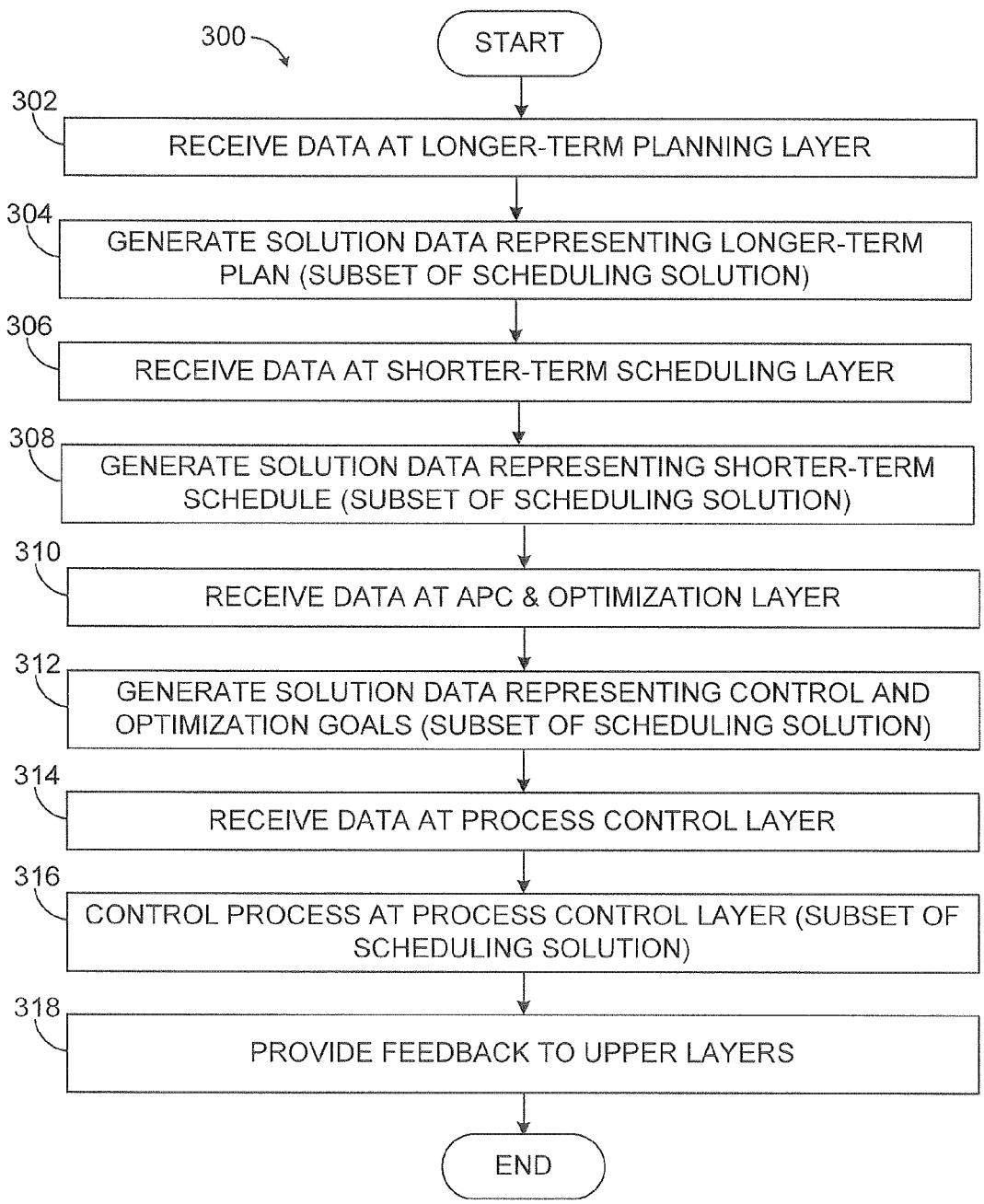

FIG. 3 illustrates an example method 300 for solving a production scheduling problem. The method 300 is illustrated and described with respect to the hierarchy 200 shown in FIG. 2. However, the method 300 could be easily modified for use in any other suitable hierarchical production scheduling or other decision-making system.

As shown in FIG. 3, data is received at a longer-term planning layer at step 302. This could include, for example, receiving model data and cycle data at the longer-term strategic and tactical planning layer 202. The model data can represent static data, while the cycle data could include various orders. Examples of the types of orders received, generated, and used by the various layers in the hierarchy are provided below. The longer-term planning layer uses the data to generate solution data representing a longer-term plan at step 304. This could include, for example, the longer-term strategic and tactical planning layer 202 determining an amount of product to be produced over a relatively longer scheduling horizon. As a simple example, the longer-term strategic and tactical planning layer 202 could determine that 100 units of product need to be produced in one month and 150 units of product need to be produced in the following month. The solution data generated here represents a subset or portion of the overall scheduling problem being solved.

Data is received at a shorter-term scheduling layer at step 306, and the data is used to generate solution data representing a shorter-term schedule at step 308. This could include, for example, receiving model data and cycle data at the shorter-term operational scheduling layer 204. The cycle data can include orders based on the solution data from the longer-term strategic and tactical planning layer 202. This could also include the shorter-term operational scheduling layer 204 determining a schedule for producing a specified amount of product within a given time period or by a specified deadline. As noted above, this step could involve multiple components operating in multiple plants 101a-101n, allowing scheduling to occur in an enterprise-wide manner.

Data is received at an advanced process control (APC) and optimization layer at step 310, and the data is used to generate solution data representing control and optimization goals at step 312. This could include, for example, receiving model data and cycle data at the advanced process control and optimization layer 206. The cycle data can include orders based on the solution data from the shorter-term operational scheduling layer 204. This could also include the advanced process control and optimization layer 206 determining how to control and optimize the operation of industrial equipment based on the received data. As noted above, this step could involve multiple components operating in multiple plants 101a-101n, allowing advanced process control and optimization across an enterprise.

Data is received at a process control layer at step 314, and the data is used to generate solution data representing control signals at step 316. This could include, for example, receiving model data and cycle data at the process control layer 208. The cycle data can include orders based on the solution data from the advanced process control and optimization layer 206. This could also include the process control layer 208 determining how to control the industrial equipment based on the received data.

Feedback can be provided to the upper layers at step 318. The feedback could, for example, come from the process control layer 208 and be provided to the other layers 202-206. The feedback could vary depending on the destination of the feedback. For instance, feedback to the two upper layers 202-204 could include current inventory levels, while feedback provided to the layer 206 could include measurement data obtained from the industrial equipment. The feedback can take the form of orders, which can be further processed by the upper layers 202-206 to generate new or revised solution data. At this point, the method 300 could be repeated, such as by returning to step 302 to process orders based on the feedback from the process control layer 208.

In this way, the production scheduling or other problem can be broken down into hierarchical layers and distributed within a control system or other system. Also, the use of orders can help to formalize the integration of the layers 202-208 in the hierarchy 200, enabling the layers 202-208 to cooperate and locate solutions to the production scheduling or other problem more efficiently and effectively.

The following describes some of the types of orders that could be used in the hierarchy 200. In this discussion, the complexity of production scheduling or other problems is represented or formulated using the unit-operation-port-state superstructure (UOPSS) and the quantity-logic-quality paradigm (QLQP). The core view of this modeling framework is to represent equipment or machines as units, tasks or activities as operations, inlet and outlet streams on units as ports, and states as any kind of resource (such as stocks, utilities, tools, or labor). Quantities in the system can be expressed in various ways, such as charge sizes, batch sizes, and lot sizes. Logics in the system can be expressed in various ways, such as start-ups, setups, switchovers, and shutdowns. Qualities in the system can be expressed in various ways, such as components, properties, and conditions.

Orders can be assigned to or associated with any of these objects (to any of the quantities, logics, or qualities in the units, operations, ports, and states). Orders can also be characterized by a start time or begin time and an end time or finish time. The orders can then be used to steer or marshal the solution to a scheduling or other problem by placing requirements on the problem in terms of decision variable bounds and constraints.

As mentioned above, if a system attribute, characteristic, or parameter has a constant value from the start to the end of a schedule and does not vary or is persistent within the horizon, it is considered as being part of the underlying model itself and is classified as model data. Information that varies within a scheduling horizon is known as cycle data. Orders are typically part of the cycle data since they are defined with timing. In some embodiments, orders may be classified as atomic, aggregated, and assembled orders.

Atomic orders represent orders associated with a single unit, operation, port, or state. Atomic orders can be cataloged into quantity, logic, and quality orders. Quantity orders are associated with variables that represent the sizing amounts of a resource, such as flows, flowrates, holdups, and yields. Flows, flowrates, and holdups could be extensive variables and could scale with the overall size of the system. Yields could be intensive representations of quantity. Logic orders refer to the logic decisions in a plant or enterprise and could be defined by binary decisions (such as on/off, yes/no, opened/closed, or active/inactive). Logic orders could include mode orders (for divergent flowpath units), material orders (for convergent flowpath units), and move orders (for movements between ports attached to units). Quality orders refer to the specifications of a resource, such as its intensive components, properties, and conditions. Process or operating conditions on unit operations (such as temperature or pressure) may also be considered in a quality order (such as when an order holds a reactor temperature to 500° C. for two hours starting tomorrow at noon).

Aggregated orders represent a collection or aggregation of atomic orders within the same UOPSS dimension. In other words, aggregation of atomic orders can be performed in one dimension (units, operations, ports, or states), such as across units with the same operation or across the same unit operation but over different time periods. Aggregated orders can be further cataloged as being quantity, logic, or quality-based. One example of an aggregated quantity order over a particular operation dimension is to establish lower and upper bounds for the total holdup across several tank units in a specific material operation or service. A more specific example is when an aggregated quantity order is used to limit the total amount of regular gasoline in all tank units for an oil refinery, which could be due to fugitive emissions restrictions.

If a combination of orders is done over different UOPSS dimensions, an assembled order is produced. Examples of assembled orders are market orders (supply and demand), which are an assemblage of a flow order (quantity order) with a mode order (logic order) and, if required, a component order and/or a property order (quality orders). Other examples of assembled orders are maintenance orders (where a unit is not available for a given amount of time during the horizon), move orders (to establish flows between unit ports in given modes of operation), and ordering orders (to establish the sequence or ordinality of mode/material operations on an individual unit as specified by the user). The ordering orders can be particularly useful for parts of plants that operate as flowshops or in multi-product/multi-stage arrangements.

Once these various types of orders are provided to or created in the hierarchy 200, a user can determine in which way a scheduling or optimization system (implemented using the layers 202-208) should respond to the orders. For example, the scheduling or optimization system may be required to satisfy certain orders (called "ordinary orders") when a schedule is solved. Ordinary orders can include atomic, aggregated, or assembled orders that need to be enforced during a specified horizon. There are also "optional orders," which represent groups, collections, or sets of orders (from which only a subset of groups, collections, or sets is enforced during a specified horizon). In MILP, optional orders can be implemented by creating an extra binary variable for each optional order, combined with a single-use or multi-use cardinality constraint on these extra binary variables to ensure that only one or a limited number of optional orders are selected. Thus, there may be as many orders enforced from a group of optional orders as specified in the cardinality constraint. In this scenario, the scheduling or optimization system may select a few orders from a pool of orders to implement during the search for a solution. The optional orders are therefore equivalent to managing cuts since they are added to or removed from the problem during an implicit enumerative search.

It is also possible for various types of orders in the layers 202-208 to be created from other orders via a process called order induction. One type of induced order (called "obtained orders") can be derived from model and cycle data in the layers 202-208. With these types of orders, it is possible to automatically generate dependent ordinary orders from independent user-specified ordinary orders that do not exclude a global optimal solution of the scheduling or other problem. This can be done by combining mathematical induction principles with the navigational model of data defined by the UOPSS superstructure. In other words, the obtained orders (dependent orders) correspond to valid-cuts (or inequalities) derived from model and cycle data that can be applied to the original problem in order to reduce the effort of the search for a solution. Some examples of obtained orders are given below.

Obtained mode orders generated from ordinary market orders: When a market order exists, a mode order may be generated on a unit adjacent to the one where the order was created for the same duration of the order. These obtained mode orders could be implemented, for example, by fixing the binary variables associated with the mode operations to a value of one (for existing market orders) or by fixing the binary variables associated with all the other mode operations on the adjacent unit to zero (for the complement scenario when market orders do not exist).

Obtained ordering orders generated from ordinary market orders: Market orders can have sequential release dates and due dates (deadlines), meaning the release date of a market order 1s later than the due date of the previous market order. If this is true, obtained ordering orders may be established for the upstream or downstream units that deliver (or lift/ship) material as a result of the market orders. The ordering orders correspond to establishing a sequence or order of mode operations on a particular unit without establishing the times at which the unit will be in those mode operations, allowing the coordination of throughputs and inventories to be synchronized appropriately.

Obtained maintenance orders generated from ordinary maintenance orders: In the case where a unit has a maintenance order defined for a given period of time, any units immediately upstream and downstream of this unit cannot be flowing material to/from that unit. Therefore, obtained maintenance orders may be created for these adjacent units as well.

Obtained mode orders generated from ordinary mode orders: In some instances, the mode operation on a given unit defines the operating modes on several upstream and downstream units. This may be the case, for example, in batch process industries where each product-stock obeys a certain processing sequence in batch units (also known as a recipe). Therefore, in production environments where there is a series of fixed processing-time batch units with no intermediate storage or "zero wait," if a mode order is placed on a given batch unit, all units in the batch line (a line of batch units) can have their mode operations determined as well. In this case, obtained mode orders can be created for the units involved in the batch line at the appropriate times. If there are batch units in parallel, obtained mode orders may be generated that do not allow any mode operation other than the one associated with the upstream and downstream unit mode order. This implies that if one of the parallel units were to start up, it could only be in the mode operation that is consistent with the adjacent unit.

Obtained mode orders generated from ordinary property orders: If a given mode operation on a unit has property lower and upper bounds specified that lie outside of a quality order, this mode operation can be excluded from the solution search for the duration of the property order (such as by setting the mode binary variable to zero).

Obtained mode orders generated from ordinary movement orders: If movement orders have zero quantities or if a maintenance order is placed on a connection between two ports, obtained maintenance orders can be generated for the adjacent units for the duration of the ordinary movement order.

It may be noted that obtained orders can be derived in an iterative fashion. For example, in a first iteration, ordinary orders can be generated that correspond to exogenous user-defined orders placed in the system in a second iteration, the obtained orders from the previous iteration can be added to a set of ordinary orders, and new obtained orders are derived from the set of all (old and new) ordinary orders. This iterative procedure could continue until all possible obtained orders have been added to the system (such as when the number of generated obtained orders is zero for a particular iteration) In particular embodiments, obtained orders could be implemented as a central order-data service in the context of service-oriented architectures (SOA). In this type of framework, the obtained order "service" would receive model and cycle data as inputs, and after processing the service would output the obtained orders to be used in a subsequent optimization.

Another type of induced order (called "orchestrated orders") can be derived from solution data in the layers 204-208. During a scheduling horizon, there may be mode operations or material operations on units that are not usually expected to appear in a scheduling or other solution under normal circumstances. For example, a fruit juice processing plant could only receive market orders for grape juice during a particular scheduling cycle, which might not be normal. A fruit juice blender unit may therefore only be expected to operate using a grape juice material operation during that cycle. No apple juice material operations on the blender unit are likely to be required since there is the likelihood that no apple juice is going to be produced. In this case, some material operations on specific units can be labeled or designated as primary (major) material operations (such as the grape juice material operation on the blender unit), while other material operations can be labeled as secondary (minor) material operations (such as apple juice or pear juice material operations). It may be noted that a primary material operation in one scheduling cycle may be designated as a secondary material operation in another cycle depending on the orders configured for the cycle in question. This suggests that another example of obtained orders is the automatic assignment of primary or secondary labels to mode/material/move operations on units as a function of, for example, ordinary market orders. These types of induced orders are called orchestrated orders.

The general idea behind orchestrated orders is to reduce the complexity of the scheduling or other problem by only enabling or freeing a few mode/material/move operations on units at each problem-solving iteration, while the remaining operations are set to a pre-specified fixed value. If the assignment of primary and secondary operations is done properly, the orchestrated orders could generate a feasible schedule in a small number of iterations (although this is not necessarily guaranteed, such as for combinatorial and non-convex problems).

As noted above, orchestrated orders are generated from the solution data of a partial problem solution. The solution data can correspond to invalid-cuts, which hopefully lead the solution search or user to arrive at useful local optimal solutions (solutions whose objective function may not be as good as the best possible solution but are found in reasonable time and are of reasonable quality). One advantage of applying orchestrated orders in MILP is the reduction in problem size at each MILP iteration, reducing the problem's complexity and consequently the time to find integer feasible solutions.

Figure 4:
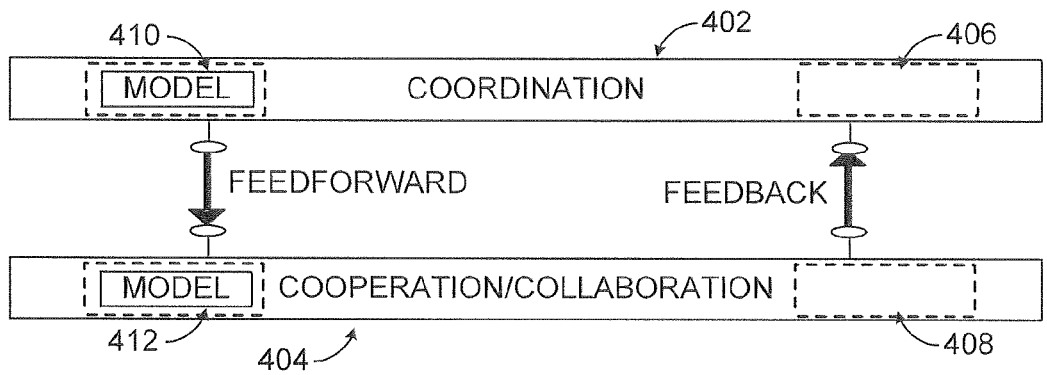

Orchestrated orders may be explained using the framework shown in FIG. 4. In FIG. 4, a complex problem to be solved (such as the production scheduling problem) is decomposed into a hierarchical decomposition 400. In this example, the hierarchical decomposition 400 includes a coordination layer 402 and a cooperation/collaboration layer 404. The term "cooperation" can be used with respect to layer 404 when the elements in the layer 404 do not have any knowledge of each other, such as when the elements are fully separable from the perspective of information. The term "collaboration" can be used with respect to layer 404 when the elements in the layer 404 can exchange at least some information relevant to the problem being solved. The two layers 402-404 in FIG. 4 could represent any two adjacent or other layers shown in FIG. 2, where the layers are using orchestrated orders.

The coordination layer 402 may be generally responsible for higher-level functions when solving a problem, while the cooperation/collaboration layer 404 may be generally responsible for lower-level functions when solving the problem. For example, the coordination layer 402 can be used to assign primary and secondary operations to orchestrated orders, and the cooperation/collaboration layer 404 can be used to determine whether those assignments enable a feasible production scheduling or other solution to be found. In the discussion that follows, components in the coordination layer 402 may be generally referred to as coordinators 406, and components in the cooperation/collaboration layer 404 may be generally referred to as cooperators 408. Also, the coordinators 406 and cooperators 408 may use models 410 and 412, respectively, during their operations. The models generally represent one or more systems associated with the problem being solved. For example, the models 410 could represent a larger number of process systems and/or larger portions of a process system, and the models 412 could represent individual process systems and/or smaller portions of a process system. It may be noted that a cooperator 408 may also function as a coordinator 406, such as when a cooperator in the layer 204 acts as a coordinator for another cooperator in the layer 206.

Figure 5:
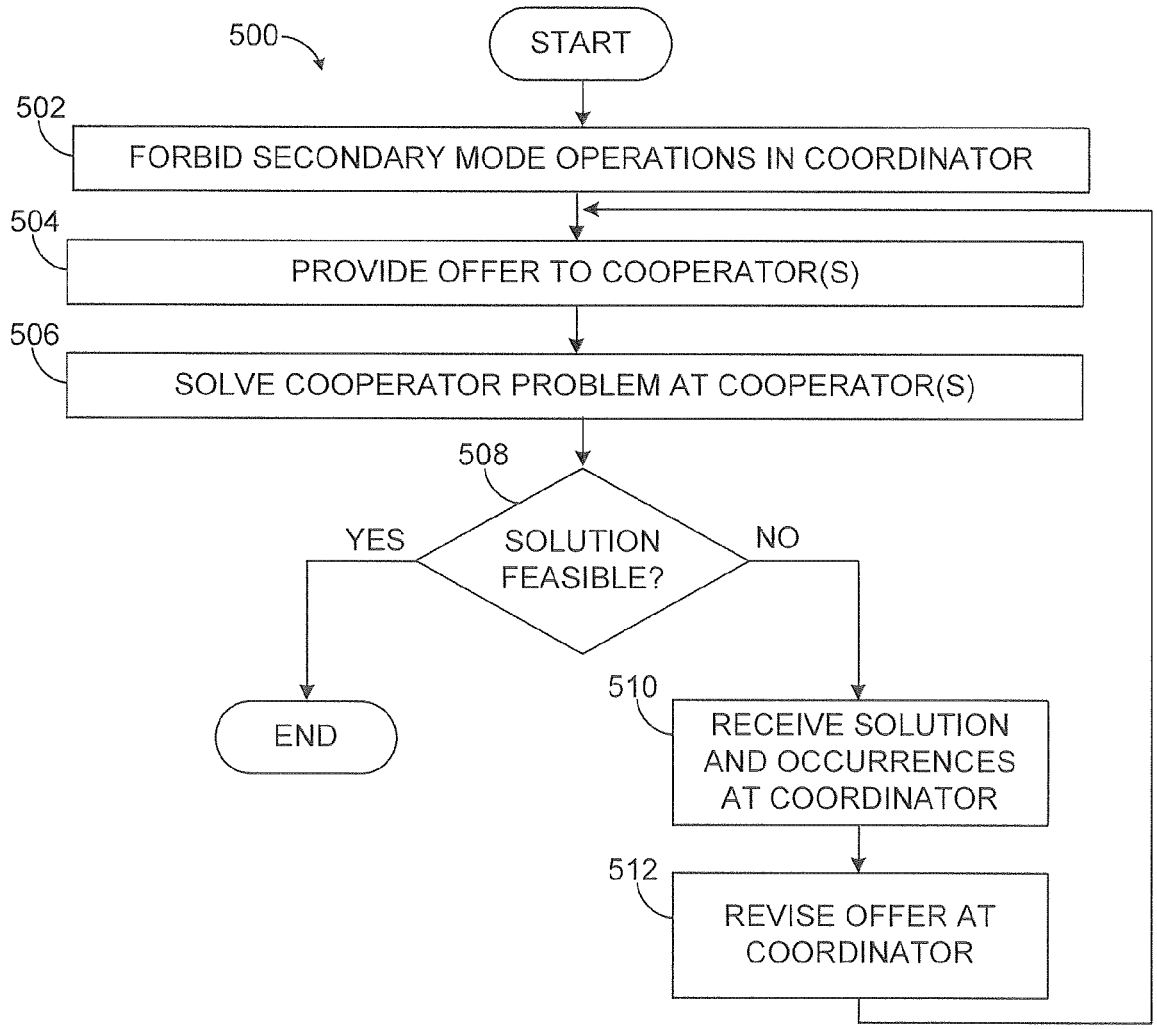

The coordinators 406 and cooperators 408 may operate as shown in FIG. 5 to support the use of orchestrated orders. In FIG. 5, a method 500 includes the coordinator forbidding the use of secondary mode operations at step 502. This may include, for example, the coordinator 406 preventing secondary mode operations from forming part of a scheduling or other solution. In the case of MILP, this may be translated into setting all operation binary variables for the secondary operations to zero or by relaxing those binary variables so that they become continuous variables within the bounds of zero and one. In this way, the coordinator 406 initially attempts to limit the mode operations to primary mode operations.

The coordinator provides an offer to at least one cooperator at step 504. An offer represents a possible solution to a problem being solved by the coordinator 406 (where the coordinator problem is a sub-problem to the general problem being solved using the decomposition 400). In this example, this may include the coordinator 406 sending mode, material, and move orders to a single cooperator 408 specifying that only the primary operations may be active at the solution. These mode, material, and move orders may represent the solution data passed from one layer to another in FIG. 2.

A cooperator problem is then solved at step 506. This could include, of example, the cooperator 408 solving a production scheduling or other sub-problem using the orders from the coordinator 406. If the cooperator problem is solved with a feasible solution, the method 500 ends. At this point, a feasible scheduling or other solution can be generated using only the primary mode operations.

If the cooperator problem is infeasible (meaning a solution cannot be found using the offer), any solution and associated infeasibilities are received at the coordinator from the cooperator at step 510. The infeasibilities identify any inability of the cooperator 408 to meet the requirements specified by the coordinator 406. The infeasibilities therefore indicate whether the offer from the coordinator 406 has been accepted by the cooperator 408. Note that the infeasibilities could be set to zero when a feasible solution is found.

The coordinator decides how to revise the offer in light of the infeasibilities at step 512. This may include, for example, the coordinator 406 receiving mode, material, or move occurrences, which define how the mode, material, or move orders could not be satisfied. The occurrences could reference the relevant solution data of the cooperator 408. Through decision-making and manipulations, the coordinator 406 could then generate another offer. As particular examples, the coordinator 406 could decide which primary and secondary operations will be forbidden for the next iteration of the method 500, as well as which primary operations will be free. As a result of this decision, additional mode, material, and move orders are generated from the occurrences and used to form another offer at step 504, which is sent to the cooperator. The method 500 can continue until one or more feasible solutions are found by the cooperator or until a time-out is reached. Note that any suitable technique could be used to determine which primary and secondary mode operations to allow in the next iteration of the method 500.

The incorporation of any type of order into the cycle data of a problem can significantly reduce its complexity and increase its understandability since, in essence, the values of variables are being fixed or forbidden. Of course, there can be tradeoffs between (i) solving a potentially large problem including all operations on the units or (ii) solving smaller problems several times by categorizing or classing operations as primary and secondary and using the orchestrated order algorithm described above. This tradeoff can be evaluated on a case-by-case basis.

While the above description has described the generation and use of various types of orders, information associated with the orders can be stored (referred to as order inventory) and exchanged between levels (referred to as order interchange) in any suitable manner. Distributed multi-cooperator/collaborator environments are very common in production scheduling, as well as in other industrial decision-making problems. This decentralization can occur since the complexity, uncertainty, and hierarchy of the system are managed along these three dimensions, which can involve a tremendous amount of interaction and intensity. An enterprise may have any number of planners and schedulers that decide on different strategies based on different stimuli and for different sections of a plant or enterprise. There may also be varying degrees of overlap, cross-over, or commonality, with or without an overall coordinator. It may therefore be important to devise an approach or policy to handle these overlaps in terms of order management.

As is the case with model, cycle, and solution data, orders may be stored or data-banked in a number of different ways. These may include the use of databases (such as OPACLE, SQLSERVER, or SYBASE databases), databooks (such as a set of spreadsheets), or datablocks (such as a portfolio of files). Any of these structures could be centralized (such as in the historian 141) or decentralized and distributed throughout the process control system 100 or other system. The order inventory could therefore be timely, accurate, and readily accessible to pertinent users. Also, permissions can be put in place to protect and secure the data by defining who is able to add, delete, and update information. Order inventory can also be used to provide a level of historicizing and retention from which continuous improvement or plan-perform-perfect studies can be performed to increase the overall economics, efficiency, and effectiveness of the system.

Order interchange can be used to facilitate transfers of orders between layers 202-208 in the hierarchy 200. Order interchange may correspond to the process of "filling" a databank with orders and "drawing" the databank of orders. This can be done, for example, according to material-flow-path concepts commonly found in supply, production, and demand chains. Each element in the hierarchy can have the responsibility of retrieving relevant orders, vetting the orders for inconsistencies, generating other internal orders if possible, and sending the orders to the appropriate databank (if there are several distributed databanks instead of one centralized databank) so that the sharing of orders is achieved. This filling and drawing or interchange of orders can also be likened to feedforward and feedback between the diverse users involved in the system. For example, a supply market order for a feed-stock plant downstream of another plant can have a corresponding demand market order for the upstream plant. Both plants can receive this information as feedforward, but if one or both plants cannot ship or receive the required quantity and quality of stock at the required time feedback information (such as obstacles, outages, and outliers) are issued so that some acceptable level of feasibility, consistency, or harmony is achieved between the two elements in the hierarchy 200.

Although FIGS. 2 through 5 illustrate one example of a technique for order generation and management to facilitate solutions of production scheduling or other decision-making problems, various changes may be made to FIGS. 2 through 5. For example, while four layers are shown in FIG. 2, production scheduling or other decision-making problems could involve any suitable number of hierarchical layers. Also, each of the layers in the hierarchy 200 could receive any suitable inputs and generate any suitable outputs (for instance, a layer may not receive all three of exogenously-defined orders, feedback, and solution data). Also, while feedback is shown only from the lowest layer 208 to the other layers 202-206, feedback could be provided from any lower layer(s) to any upper layer(s). Further, while FIGS. 3 and 5 illustrate methods having sequences of steps, various steps in FIGS. 3 and 5 could overlap, occur in parallel, occur in a different order, or occur any suitable number of times. In addition, the hierarchical decomposition 400 in FIG. 4 could include any number and type of coordinators and cooperators.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contains be contained within, connect to or with, couple to or with, be communicable with, cooperate with, interleave, juxtapose, be proximate to, be bound to or with, have, have a property of, or the like. The term "controller" means any devices system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A system comprising:
    at least one computing device configured to execute one or more software applications associated with a plurality of hierarchical layers configured to solve a production scheduling problem;
    wherein each hierarchical layer is configured to generate solution data representing a possible solution to a sub-problem associated with the production scheduling problem, each hierarchical layer configured to receive orders and to use the orders during generation of the solution data, the orders comprising at least one of: orders based on the solution data from a higher hierarchical layer, orders based on feedback from a lower hierarchical layer, and orders that are exogenously provided;
    wherein a first of the hierarchical layers comprises a coordinator configured to generate a first offer identifying whether certain operations performed in a process system are primary or secondary operations;
    wherein a second of the hierarchical layers comprises a cooperator configured to receive the first offer and to use the first offer to determine whether the sub-problem associated with the second hierarchical layer can be solved based on the first offer; and
    wherein the coordinator is further configured to generate a second offer when the cooperator indicates that the sub-problem cannot be solved based on the first offer and to adjust which operations are primary or secondary operations to produce the second offer.

2. The system of claim 1, wherein each hierarchical layer is configured to use the orders to simplify a search for the possible solution to the sub-problem being solved by that hierarchical layer.

3. The system of claim 2, wherein the orders are used to simplify the search for the possible solution by excluding solutions inconsistent with the orders.

4. The system of claim 1, wherein at least some of the hierarchical layers perform decision-making over different time horizons.

5. The system of claim 1, wherein at least one hierarchical layer is further configured to generate induced orders based on the orders received by that hierarchical layer.

6. The system of claim 1, wherein the hierarchical layers comprise multiple software applications executed on multiple computing devices, the computing devices distributed at multiple levels in a process control system.

7. A method comprising:
    receiving orders at a first hierarchical layer, the first hierarchical layer configured to solve a first sub-problem associated with a production scheduling problem using the orders;
    generating first solution data representing a possible solution to the first sub-problem; and
    outputting the first solution data;
    wherein the orders comprise at least one of: orders based on second solution data, orders based on feedback, and orders that are exogenously provided;
    wherein at least one of the second solution data and the feedback is received from at least one second hierarchical layer, the at least one second hierarchical layer configured to solve at least one second sub-problem associated with the production scheduling;
    wherein one of the hierarchical layers comprises a coordinator that generates a first offer identifying whether certain operations performed in a process system are primary or secondary operations;
    wherein another of the hierarchical layers comprises a cooperator that receives the first offer and uses the first offer to determine whether the sub-problem associated with the other hierarchical layer can be solved based on the first offer; and
    wherein the coordinator generates a second offer when the cooperator indicates that the sub-problem cannot be solved based on the first offer and adjusts which operations are primary or secondary operations to produce the second offer.

8. The method of claim 7, wherein generating the first solution data comprises simplifying a search for the possible solution to the first sub-problem.

9. The method of claim 8, wherein simplifying the search for the possible solution comprises excluding solutions to the first sub-problem that are inconsistent with the orders.

10. The method of claim 7, wherein the hierarchical layers are associated with different time horizons.

11. The method of claim 7, further comprising:
    generating induced orders at the first hierarchical layer based on the orders received by the first hierarchical layer;
    wherein generating the first solution data comprises using the orders received by the first hierarchical layer and the induced orders generated by the first hierarchical layer.

12. The method of claim 7, wherein at least one of the orders received by the first hierarchical layer is provided by a user, the user submitting the at least one order to guide a solution to the production scheduling problem.

13. A tangible computer readable storage medium embodying a computer program, the computer program comprising:
    computer readable program code for receiving orders at a first hierarchical layer, the orders associated with a production scheduling problem;
    computer readable program code for solving a first sub-problem associated with the production scheduling problem using the orders to produce first solution data, the first solution data representing a possible solution to the first sub-problem; and
    computer readable program code for outputting the first solution data;
    wherein the orders comprise at least one of: orders based on second solution data, orders based on feedback, and orders that are exogenously provided;
    wherein at least one of the second solution data and the feedback is received from a second hierarchical layer, the second hierarchical layer configured to solve a second sub-problem associated with the production scheduling;
    wherein one of the hierarchical layers comprises a coordinator configured to generate a first offer identifying whether certain operations performed in a process system are primary or secondary operations;

wherein another of the hierarchical layers comprises a cooperator configured to receive the first offer and to use the first offer to determine whether the sub-problem associated with the other hierarchical layer can be solved based on the first offer; and wherein the coordinator is further configured to generate a second offer when the cooperator indicates that the sub-problem cannot be solved based on the first offer and to adjust which operations are primary or secondary operations to produce the second offer.

14. The computer readable storage medium of claim 13, wherein the computer readable program code for generating the first solution data comprises:

computer readable program code for simplifying a search for the possible solution to the first sub-problem by excluding solutions to the first sub-problem that are inconsistent with the orders.

15. The computer readable storage medium of claim 13, further comprising:

computer readable program code for generating induced orders based on the received orders.

16. The computer readable storage medium of claim 13, wherein at least one of the orders received by the first hierarchical layer is provided by a user to guide a solution to the production scheduling problem.

17. The system of claim 1, wherein the plurality of hierarchical layers comprise:

a scheduling layer configured to determine a schedule for producing an amount of a product within a given time period; and a control layer configured to receive orders regarding the schedule from the scheduling layer, determine how to control equipment based on the schedule, and provide feedback regarding the control of the equipment to the scheduling layer.

18. The apparatus of claim 1, wherein at least one of the orders comprises at least one order provided by a user that guides a solution to the production scheduling problem.

19. The method of claim 7, wherein the hierarchical layers comprise:

a scheduling layer that determines a schedule for producing an amount of a product within a given time period; and a control layer that receives orders regarding the schedule from the scheduling layer, determines how to control equipment based on the schedule, and provides feedback regarding the control of the equipment to the scheduling layer.

20. The computer readable storage medium of claim 13, wherein the hierarchical layers comprise:

a scheduling layer configured to determine a schedule for producing an amount of a product within a given time period; and a control layer configured to receive orders regarding the schedule from the scheduling layer, determine how to control equipment based on the schedule, and provide feedback regarding the control of the equipment to the scheduling layer.

* * * * *